FIG. I

INVENTOR.
FELIX S. WEISS

July 30, 1968    F. S. WEISS    3,394,441
METHOD OF MANUFACTURING CAPACITORS
Original Filed June 15, 1961    2 Sheets-Sheet 2

INVENTOR.
FELIX S. WEISS
BY
ATTORNEY

United States Patent Office 3,394,441
Patented July 30, 1968

3,394,441
METHOD OF MANUFACTURING CAPACITORS
Felix S. Weiss, Lake Success, N.Y., assignor to Cornell-Dubilier Electric Corporation, a corporation of Delaware
Application June 16, 1964, Ser. No. 375,604, now Patent No. 3,315,331, which is a continuation of application Ser. No. 120,869, June 15, 1961, which in turn is a continuation-in-part of application Ser. No. 579,679, Apr. 20, 1956. Divided and this application Nov. 3, 1966, Ser. No. 591,749
2 Claims. (Cl. 29—25.42)

ABSTRACT OF THE DISCLOSURE

An improved method for processing disc capacitors wherein the capacitors are secured to a carrier strip with the body of the capacitor laterally disposed of the strip. The process includes coating the body portions and adjoining portions of the terminal wires of the capacitors with an insulating coating, successively, and then forming a roll of the portion of the strip with the capacitors thereon free of contact with anything capable of deforming the coatings thereon and thence subjecting the resulting roll of carrier strip bearing coated capacitors to a drying environment.

---

Figure 1:
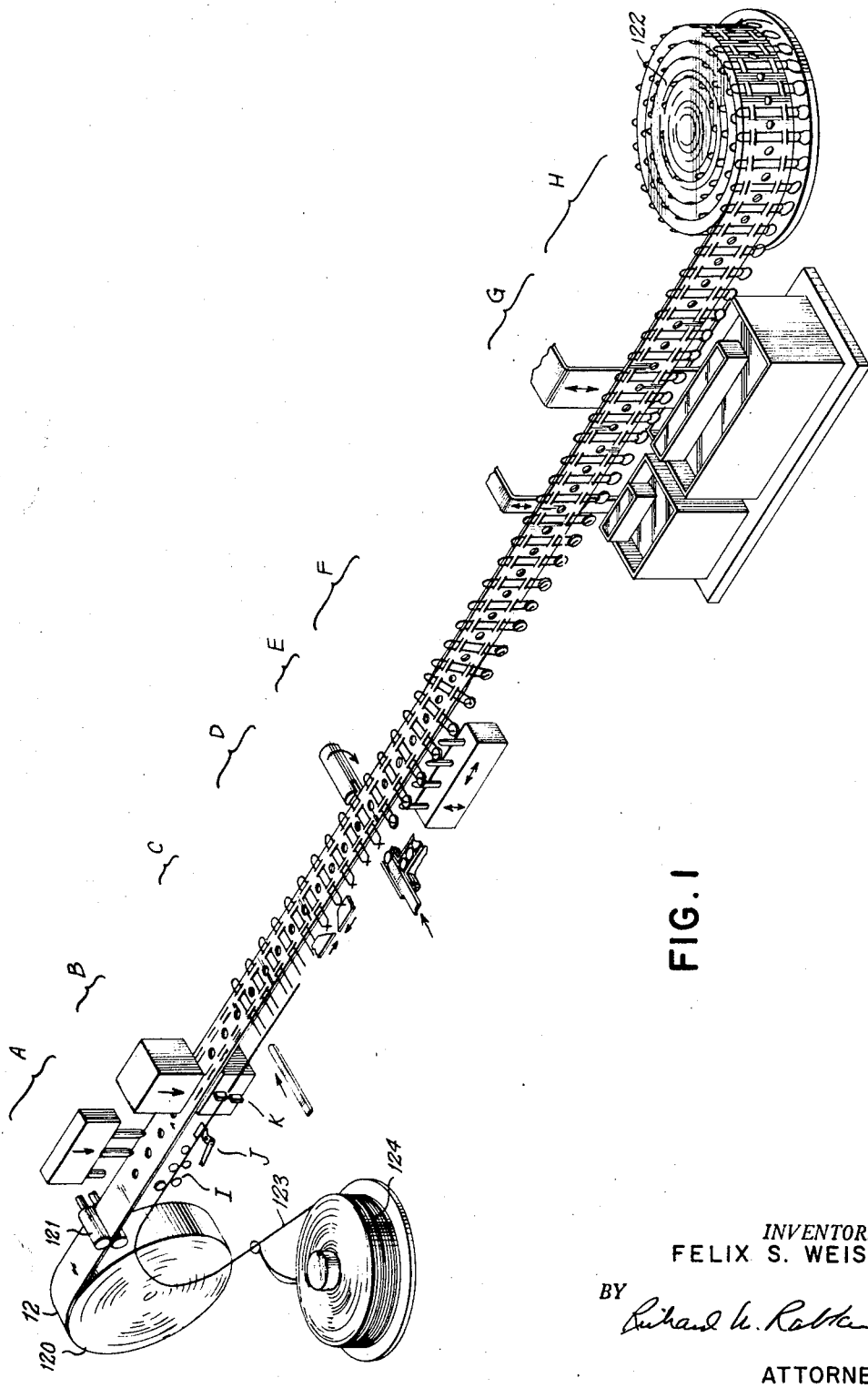

This application is a division of my application Ser. No. 375,604, filed June 16, 1964, now Pat. No. 3,315,331, which is a continuation of my application Ser. No. 120,869 filed June 15, 1961, (now abandoned) and the latter application was a continuation-in-part of my application Ser. No. 579,679 filed Apr. 20, 1956 now abandoned. Other continuations and continuations-in-part of said application Ser. No. 579,679 are Patents Nos. 3,079,-957, issued Mar. 5, 1963; 3,080,908, issued Mar. 12, 1963; 3,091,835, issued June 4, 1963; and 3,168,885, issued Feb. 9, 1965. Further, my Patent No. 3,231,082 issued Jan. 25, 1966, is a division of Ser. No. 799,200 filed Mar. 13, 1959 (now abandoned) which was a division of my aforementioned application Ser. No. 579,679.

This invention relates to the manufacture of capacitors and particularly to an improved method for the continuous and automatic manufacture of ceramic disc capacitors and like articles.

Recent years have witnessed an expanding field of use for ceramic capacitors of the so-called disc type, due in part to their relatively small size and in part to their ready adaptability, when properly arranged, for use in conjunction with automatic assembly machinery for installation purposes.

Ceramic disc capacitors of the type with which we are herein particularly concerned include a relatively small ceramic dielectric disc having a layer of conducting material disposed on each of the opposite faces thereof, and serving as the electrode elements for the capacitor unit. Secured to each of said layers of conducting material is a suitable terminal or lead wire, and the entire assembly, save for the extending portion of the terminal wires, is covered with a coating of suitable insulating material. Conventional fabrication procedures for the manufacture of such capacitors have been almost, if not entirely, discontinuous in nature involving relatively delicate, tedious and time consuming hand operations which have limited production and have contributed materially to the costs of the finished product. Efforts have been made to overcome the above problems by the utilization of machines or machine-like adjuncts facilitating batch handling of subassemblies, however in all such instances production has been limited by the necessity of performing manual operations on the individual capacitor subassemblies at one or more points during the fabrication procedure. In light thereof, quantity manufacture of such small sized units by present day methods is relatively slow, costly and difficult, due in part to required manual fabrication steps which result in excessive labor costs and production limitations and in part to the necessary precautions required for maintenance of physical and electrical uniformity of the finished units.

The herein disclosed subject matter is intended to be illustrative of my improved manufacturing method and the specifically illustrated embodiment may be briefly described as a novel and improved construction for a ceramic disc capacitor fabricating machine embodying the subject method and in which an elongate continuous strip of dispensable material serves, in addition to a packaging mount for the finished products, as an advanceable web conveyor to continuously position, transfer, introduce and remove capacitor constituent elements and progressively formed subassemblies thereof relative to a plurality of sequentially arranged, cyclically operable and adjacently positioned operating stations in which the sequential fabricating steps are concurrently and sequentially effected on the conveyor strip supported work pieces. Included therein are means for preparing the dispensable strip conveyor to serve as the carrier for the progressively formed work pieces and means for effecting the progressive fabrication of the capacitors which include, in sequence, progressive formation of capacitor subassemblies on the carrier strip from capacitor unit constituent elements, fluxing, soldering, degreasing, insulation coating, drying, testing, counting and code identification.

Among the advantages attendant the instant invention are an appreciable reduction in manufacturing costs effected through labor savings and increases in production rates and the production of clearly identified finished units of uniform quality and of a character that facilitates the utilization of automatic assembly machinery and permits continuous inventory and usage control in the hands of the ultimate user. In addition thereto the progressive fabrication of subassemblies, while the same are securely maintained in predetermined positional relationship on the conveyor, prevents undesired deformation of easily deformable constituent elements such as lead wires and the like.

The object of this invention is the provision of an improved method for the automatic fabrication of ceramic disc capacitors and like articles.

A further object of this invention is the provision of an improved manufacturing method for ceramic disc capacitors that facilitates production planning and organization as well as permitting reduction in manufacturing costs and increases in production rates.

Other objects and advantages of the invention will be pointed out in the following disclosure and claims and will be apparent from the accompanying drawings, which disclose, by way of example, the principles underlying the invention and the presently preferred apparatus by which said principles may be usefully employed in the production of finished units that enjoy most, if not all, of the advantages flowing from this invention.

Figure 2:
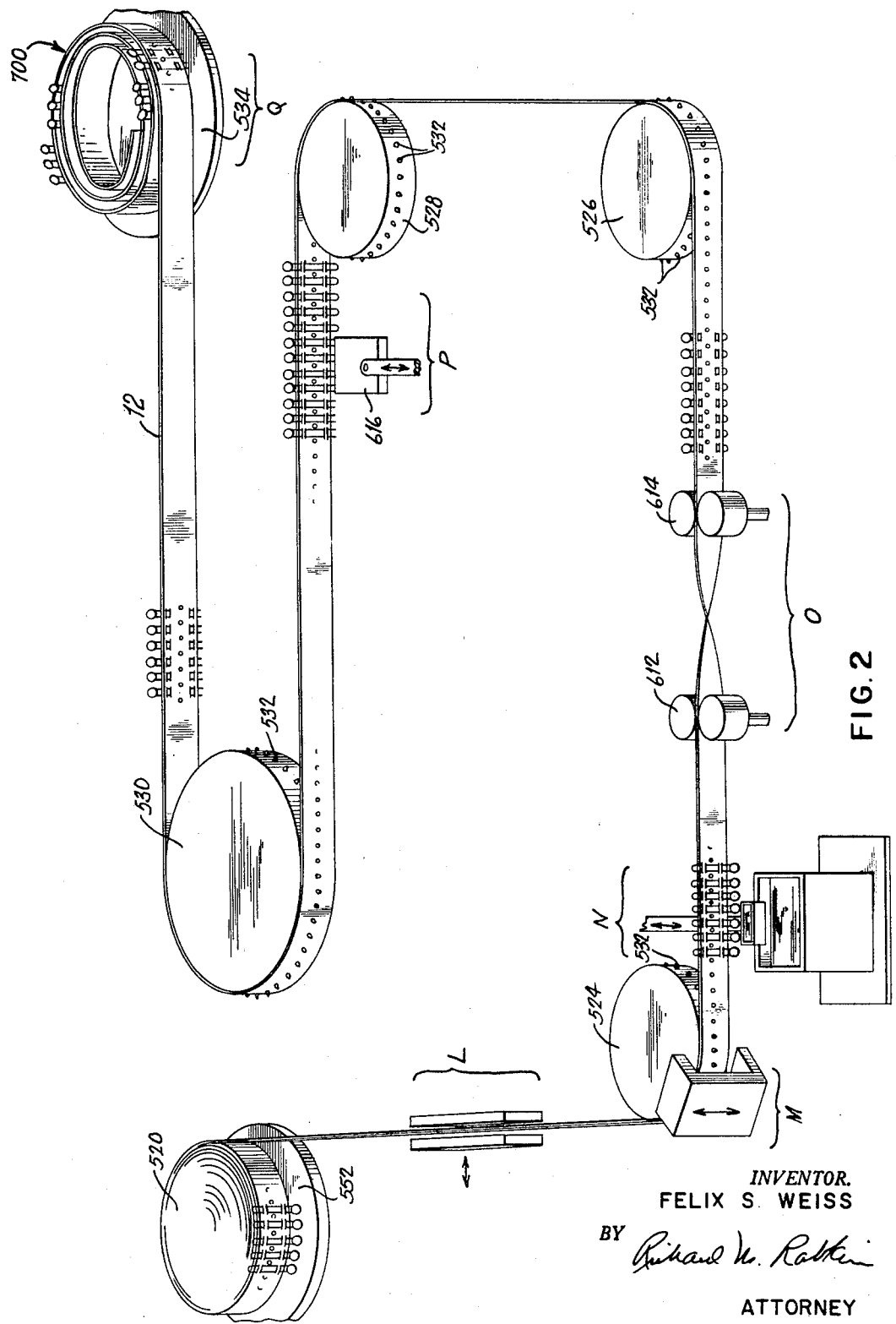

Referring to the drawings:

FIG. 1 is a detailed schematic flow diagram indicative of the essential and preferred operations necessary to the formation and processing of ceramic disc-type capacitor subassemblies through the soldering operation; and FIG. 2 is a detailed schematic flow diagram indicative of the essential and preferred operations necessary to the further processing of the soldered ceramic disc subassemblies in the formation of the finished units, FIGS. 1 and 2 when taken together being indicative of a complete processing sequence.

The complete procedure shown in the drawing is intended to generally cover the entire sequence of operations from initial raw material treatment to the ultimate production of a package mount of finished capacitor units except for the possible omission of certain minor steps which have no outstanding relation to the invention and which will be fully understood by persons skilled in the art. It will be appreciated that many of the elements of apparatus appearing in the drawings are schematic in nature, in that for the most part they are intended to afford a recognizable indication of apparatus suitable for the type of operation at various stages, rather than to restrict the system to the deails of any paricular device which might be employed to perform such operation.

By way of general introduction, the complete procedure may include the step of preparing a dispensable strip or web of conveyor material to receive a prepared terminal wire assembly, preparing and inserting the terminal wire assembly into the previously prepared strip material, inserting the previously prepared capacitor units into the prepared terminal assemblies mounted on the strip conveyor to form a capacitor subassembly, and then progressively treating the above described subassembly to form the finished capacitor unit as by soldering the terminal leads to the conducting surfaces of the capacitor unit, and suitable insulation and drying steps. Notably important aspects of the present invention reside in the discovery that the improvement and simplification of the entire procedure may be realized by utilizing a dispensable strip conveyor as a carrier to continuously position, transfer, introduce and remove the constituent elements and progressively fabricated subassemblies during the passage thereof through the sequentially arranged operating stations and as the ultimate packaging mount as well as by taking advantage of certain interrelationships between the several steps.

The dispensable or expendable strip or web material used herein as a conveyor may be a relatively thick paper such as that used in file folders or tabulating cards, or relatively thin cardboard or the like, of such width to serve as a packaging mount for, and to accommodate the size of finished capacitors being fabricated. The strip material should be of such mechanical strength and flexibility to serve as a carrier or conveyor for the constituent elements of the capacitor assembly during the sequential fabrication operations to be described. It should also be of such character to withstand the temperatures within the preliminary drying unit and bake oven described herein.

FIGS. 1 and 2 schematically illustrate the presently preferred sequence of operations for practicing the invention in the manufacture of ceramic disc capacitors as well as illustrating the essentials of apparatus presently preferred for effecting the fabrication of such units as shown and described in my Patent No. 3,315,331.

As shown in FIG. 1, the conveyor material 12 is drawn in strip or web form from a supply reel 120 by a pair of pressure rollers 121 and is continuously drawn successively through a series of operating stations such as:

A pilot hole perforating station A wherein a series of indexing pilot holes are punched in the web (see my Patent No. 3,231,082);

A web slitting station B wherein spaced longitudinal slits are made in the web intermediate the pilot hole perforations therein (see my Patent No. 3,231,082);

A terminal wire subassembly forming and insertion station C wherein a length of terminal wire is formed and inserted into the terminal wire subassembly mounting slits in the web (see my Patent No. 3,079,957);

A terminal wire end-forming station D wherein the ends of the inserted terminal wire subassembly are deformed to receive a ceramic capacitor disc (see my Patent No. 3,080,908);

A ceramic disc insertion station E wherein ceramic capacitor discs are inserted into the deformed ends of the terminal wire subassemblies (see my Patent No. 3,091,835), by a web driving indexing unit F. The web drive unit F is, as described in detail in my Patent No. 3,315,331, a cyclically operable unit arranged to intermittently advance the web a predetermined distance during each cycle of operation with intermediate dwell periods during which time the other operating components are actuated to perform their respective operative functions. Subsequent to the passage of the web through the web drive unit F, the web and the capacitor subassemblies mounted thereon are displaced to the vertical position and are drawn, by winding reel 122, through a flux dipping station G wherein the mounted ceramic capacitor discs are treated with a flux and a solder dipping station H wherein the flux treated units are soldered (see my Patent No. 3,168,885). Cooperatively associated with the above-identified operating units is a terminal wire supply reel 124, a wire straightening station I, a terminal wire drive station J, and a terminal wire cutting station K all arranged to present a predetermined cut length of straightened terminal wire to the terminal wire insertion station C for the formation of the terminal wire subassembly and insertion of the same into the previously prepared web of dispensable conveyor material.

In actual operation it may be desirable to interrupt the above-described continuous process after the soldering operation at station H to permit batch degreasing operations before resumption of a continuous flow process for production of complete units. Continuous degreasing operations as illustrated in my Patent No. 3,215,331 can be included. However, certain present-day practical and economic considerations lead to the preferential use of batch-type degreasing operations. Consequently, therefore, it is preferred to remove the web and capacitor subassemblies mounted thereon from the rewind mandrel 122 (see FIG. 1) and subject the same to batch degreasing operations. Subsequent to the degreasing operation, continuous type fabrication is resumed as best illustrated in FIG. 2.

As shown in FIG. 2 and described more fully in by Patent No. 3,315,331, continuous fabrication is resumed by placing a roll 520 of web mounted degreased capacitor sub-assemblies upon an unwinding mandrel 522. The web material is intermittently drawn in increments equal to the spacing between successive pilot pin perforations therein from the unwind mandrel 522 by the action of a plurality of suitably driven guide rollers 524, 526, 528 and 530 located to define the path of travel of the web and provided with extending pilot pins 532 thereon spaced to drivingly engage successive pilot pin indexing perforations in the web of dispensable material. The path of travel of the web, as defined by the above-identified guide rollers, includes:

Sequential passage of the web and capacitor sub-assemblies mounted thereon through a terminal straightening station L, wherein any deformation of the terminal wire portions of the web mounted capacitor subassemblies incurred during the degreasing operation is removed;

Through a subassembly positioning station M, wherein the height of the dependent web mounted ceramic capacitor units relative to the centerline of the web is carefully preset;

Through an insulation dip station N, wherein the dependent ceramic capacitor discs and adjacent portions of the terminal leads secured thereto are given an insulating coating of predetermined thickness (see my Patent No. 3,168,885);

Through a web reversing station O wherein the dependent coated ends of the web mounted capacitor subassemblies are elevated to prevent undesired drop formation on the dependent ends therof by drying insulating coating (see my Patent No. 3,168,885);

Through an elongate drying path to permit at least partial setting of the external coating and which includes a wire cutting station P wherein the rounded extending ends of the web mounted terminal leads are severed to provide discrete terminal leads selectively connected to the electrode surfaces on the capacitor discs; and Into a rewind station Q wherein the web and capacitor units mounted thereon are rewound upon a rewind mandrel 534 with an interleaved spacing belt to assure separation between successive layers of the still not completely dry web mounted capacitor units. The roll is then preferably removed from the mandrel 534 and batch dried prior to further processing through testing and marking stations as illustrated in my Patent No. 3,315,331.

In operation of the above described unit, it has been found preferable to wind the web mounted capacitor units as above constituted upon a rewind mandrel 534 to permit batch oven drying operations thereon. If such a procedure is followed it may be also desirable to employ an interleaving belting strip to space the wound capacitor units in the event the insulating material employed is of a character that does not completely set in the drying time afforded by the elongate drying path.

Processing the web mounted capacitor units through batch oven drying operations results in the provision of pluralities of finished ceramic disc capacitor units package mounted on said web of dispensable conveyor material. Subsequent thereto the units may be passed, while still web mounted, through voltage and capacity test stations as illustrated in my Patent No. 3,315,331 and any desired counting and marking procedures as would be required by particular customer demands.

In intsances wherein the length of strip material on the roll 700 corresponds to that of the finished package, for example, for bulk supply to retailers who may themselves cut off lengths in accordance with individual sales of small quantities, the conveyor strip 12 may be wound into a roll or folded into a stack, after which it may suffice in many instances merely to secure the end of the roll or the folds of the stack in place to secure the final package. Additional wrapping of course may be provided and the resulting package placed in boxes or crates for transport purposes.

It will be further appreciated that with the arrangements described the articles remain securely held in position in the same strip of material throughout their manufacture, assembly, testing, marking, packaging and delivery. This has many advantages, among which may be especially mentioned the avoidance of risk of confusion with articles of generally similar appearance but with different characteristics, as for example can frequently arise with hand packaging when the article happens to be one of a range of similar articles with different ratings. In addition, the cost of the dispensable conveyor strip is extremely small in comparison to the cost of the units mounted thereon, for example, the cost of 500 finished capacitors of the type described herein would be in the order of $18.00 to $20.00 whereas the cost of 50 feet of strip conveyor material on which the units would be mounted would be at best in the order of a few cents.

Having thus described my invention, I claim:

1. In the fabrication of disc capacitors having terminal wire portions projecting from body portions, the steps of providing a carrier strip of great length with a succession of disc capacitors spaced apart along the strip with their wire portions secured to the strip and with the body portions of the capacitors projecting laterally from the strip, coating said body portions and the adjoining portions of the terminal wires of said capacitors in succession with an insulating coating, progressively forming a roll of the portion of the strip that bears capacitors after they are successively coated with the capacitors thereon free of contact with anything capable of deforming the coating thereon, and subjecting the resulting roll of carrier strip bearing coated capacitors to a drying environment.

2. The method in accordance with claim 1, further including the steps of rolling a spacing belt between successive convolutions of said roll as the roll is formed.

References Cited

UNITED STATES PATENTS

| | | | |
|---|---|---|---|
| 1,530,873 | 3/1925 | Williams | 34—24 X |
| 2,929,130 | 3/1960 | Packman | 29—25.42 |
| 2,954,117 | 9/1960 | Freeburg | 29—25.42 X |

WILLIAM I. BROOKS, *Primary Examiner.*